United States Patent [19]

Dolfini et al.

[11] 3,852,283

[45] Dec. 3, 1974

[54] AMINO ACID DERIVATIVES OF CEPHALOSPORINS

[75] Inventors: Joseph Edward Dolfini, Princeton; Raymond Curry Erickson, Metuchen, both of N.J.

[73] Assignee: E. R. Squibb & Sons, Inc., Princeton, N.J.

[22] Filed: Dec. 11, 1972

[21] Appl. No.: 313,708

[52] U.S. Cl. .............................. 260/243 C, 424/246
[51] Int. Cl. ............................................. C07d 99/24
[58] Field of Search ................................. 260/243 C

[56] References Cited
UNITED STATES PATENTS
3,352,850   11/1967   Doyle et al. ...................... 260/239.1

*Primary Examiner*—Nicholas S. Rizzo
*Attorney, Agent, or Firm*—Lawrence S. Levinson; Merle J. Smith; Donald J. Barrack

[57] ABSTRACT

Novel cephalosporins having the formula:

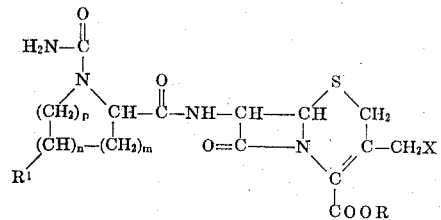

are disclosed along with methods for the preparation of these compounds.

6 Claims, No Drawings

AMINO ACID DERIVATIVES OF CEPHALOSPORINS

BRIEF DESCRIPTION OF INVENTION

The novel cephalosporins of this invention are represented by the formula:

I
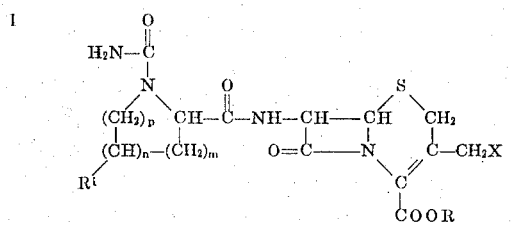

wherein R may be hydrogen, lower alkyl, acyloxymethyl, or a salt-forming ion; $R^1$ may be hydrogen, hydroxy, or the group

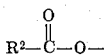

wherein $R^2$ may be lower alkyl or aryl; X may be hydrogen, hydroxy, the radical of a nitrogen base, a quaternary ammonium radical, or the group

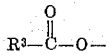

wherein $R^3$ may be lower alkyl; $n$ may be 0 or 1; $m$ may be 0, 1, 2, 3, or 4; $p$ may be 1, 2, 3, or 4; and the sum of $n+m+p$ may be 1, 2, 3, 4, or 5.

Alternatively, X and R may represent a bond linking carbon and oxygen in a lactone ring.

DETAILED DESCRIPTION OF THE INVENTION

By "lower alkyl" is meant alkyl groups containing from 1 to 7 carbon atoms; the expression is meant to include both straight and branched chain hydrocarbon radicals. Examples of such groups include methyl, ethyl, propyl, butyl, isobutyl, t-butyl, amyl, etc.

The aryl groups are monocyclic carbocyclic aryl groups that may be unsubstituted or may include simple substituents such as the halogens (chlorine and bromine being preferred), lower alkyl groups (as defined above), lower alkoxy groups (i.e. lower alkyl groups of the type defined above attached to an oxygen), hydroxy, carboxy, etc.

Examples of salt forming ions are the alkali metals (e.g. sodium or potassium), the alkaline earth metals (e.g. calcium or magnesium) and radicals of organic bases (e.g. dibenzylamine, N,N-dibenzylethylenediamine).

The acyloxymethyl group may be represented by the formula

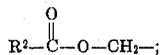

$R^2$ is as defined above.

Acyloxymethyl esters of the type contemplated for use in this invention may be exemplified by acetoxymethyl, propionyloxymethyl, isopropionyloxymethyl, butyryloxymethyl, pivaloyloxymethyl, and benzoyloxymethyl esters. Production of the acyloxymethyl esters may be achieved by a procedure adapted from the method of Daehne et al., Jour. Med. Chem. 13, 607 (1970). A halomethyl ester having the formula YCH$_2$OCOR$^2$, wherein $R^2$ is as previously defined and Y is a halogen (preferably chlorine or bromine), is reacted with either 7-aminocephalosporanic acid, 7-aminodesacetoxycephalosporanic acid, or other derivatives of the cephalosporin nucleus (starting materials for this invention) or with the acid form of the cephalosporin of formula I.

As set forth above, X may be hydrogen, hydroxy, the radical of a nitrogen base, a quaternary ammonium radical, or the group

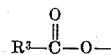

(wherein $R^3$ may be lower alkyl). Exemplary of the nitrogen bases contemplated are methylamine, ethylamine, dimethylamine, triethylamine, dibenzylamine, N,N'-dibenzylpyridinium, pyridinium, 1-quinolinium, 1-picolinium, etc. Exemplary of the acyloxy groups represented by the formula

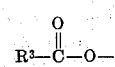

are acetoxy, propionyloxy, isopropionyloxy, butyryloxy, and pivaloyloxy.

The novel compounds of this invention may be produced from 7-aminocephalosporanic acid compounds and amino acids. The 7-aminocephalosporanic acid compounds have the following structure:

II
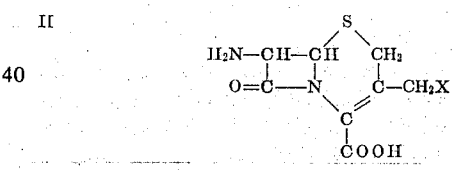

wherein the symbols R and X are as defined above. X is preferably hydrogen or acetoxy. Applicants contemplate the use of 7-aminocephalosporanic acid (7-ACA), 7-amino-3-desacetoxycephalosporanic acid (7-ADCA), and other derivatives of formula II. The amino acids useful in this invention have the following structure:

III
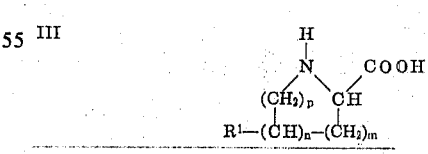

wherein $R^1$, $n$, $m$, and $p$ are as defined above. The amino acids of formula III may be readily synthesized from known materials; alternatively, naturally occurring amino acids may be used. Aziridine-2-carboxylic acid, azetidine-2-carboxylic acid, proline, hydroxyproline, 4-hydroxypipecolic acid, and 5-hydroxypipecolic acid are examples of amino acids of the type that are useful as starting materials for this invention. Proline and hydroxyproline are preferred amino acids.

Reaction of an amino acid with an alkali metal cyanate or an alkaline earth metal cyanate yields an N-carbamyl amino acid (formula IV):

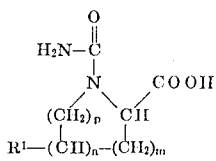

In forming the N-carbamyl amino acid, an aqueous suspension of the amino acid is reacted with the cyanate. Heating the suspension for a short period of time (e.g. about 5 minutes) yields a solution. The reaction proceeds at room temperature and may take anywhere from 30 minutes to several days, usually around 2 days. Periodically, the pH of the solution is adjusted to make it slightly acidic (i.e. a pH of between about 5.0 and 6.5); the pH adjustment may be accomplished by use of a mineral acid (e.g. hydrochloric acid). The N-carbamyl amino acid may be precipitated from the solution by acidification and chilling.

The N-carbamyl amino acid is converted to an activated form such as a mixed carbonic anhydride before it is reacted with a cephalosporin to yield the novel cephalosporins of this invention. This conversion is effected by dissolving the N-carbamyl amino acid in a ketone solvent containing a tri-(lower) alkyl amine and treating the solution with anhydride forming reagent, e.g. a lower alkyl chloroformate or an aryl chloroformate at a temperature of from about 0° to −20°C.

The final product:

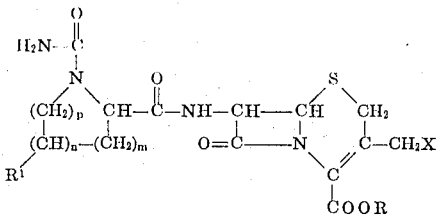

is obtained by reacting the mixed anhydride with a 7-aminocephalosporanic acid compound of formula II at a temperature of about −20° to +50°C. Recovery of the product may be had by precipitation (after acidification of the reaction mixture) or by extraction into an organic solvent such as ethyl acetate from an acidified reaction mixture that has been saturated with ammonium sulfate, or similar buffer.

An alternative method for producing the novel cephalosporins of the invention is to couple the N-carbamyl amino acid (produced as detailed above) with a 7-aminocephalosporanic acid compound of formula II in an acetone-water (8:2) solution using a carbodiimide (e.g. dicyclohexylcarbodiimide) as the condensing reagent. Excess carbodiimide is converted to the corresponding urea by acidification, the pH is adjusted to near neutrality and the urea is removed by filtration. The products may be recovered by acidification or extraction as has been detailed above.

Other methods known to the art may be used such as coupling the N-carbamyl acid via its activated (e.g. p-nitrophenyl) ester, imidazole carbonyl complex, azide, etc.

Still another alternative for forming the products of this invention (formula I) is to acylate a 7-aminocephalosporanic acid compound of formula II with an amino acid (formula III), and react the resulting cephalosporin with an alkali metal cyanate in the presence of water to form the final product (formula I). The acylation is carried out using procedures that are conventional in the art.

It will be appreciated that certain of the compounds of this invention exist in various states of solvation as well as in different optically active forms. The various forms as well as their mixtures are within the scope of this invention. Ordinarily the new cephalosporin derived from the D-form of the amino acid is more active than that derived from the L-form or the DL-form.

The compounds of this invention have a broad spectrum of antibacterial activity against both gram positive and gram negative organisms such as *Staphylococcus aureus*, *Salmonella schottmuelleri*, *Proteus mirabilis*, *Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to cephalothin and other cephalosporins. For example, a compound of formula I may be used in various animal species in an amount of about 1 to 200 mg/kg, daily, orally or parenterally, in single or two to four divided doses to treat infections of bacterial origin.

Up to about 600 mg of a compound of formula I or a physiologically acceptable salt thereof may be incorporated in an oral dosage form such as tablets, capsules or elixirs or in an injectable form in a sterile aqueous vehicle prepared according to conventional pharmaceutical practice.

In cleaning or disinfecting compositions, e.g., in barns or dairy equipment, a concentration of about 0.01 to 1% by weight of such compounds admixed with, suspended or dissolved in conventional inert dry or aqueous carriers for application by washing or spraying may be used. They are also useful as nutritional supplements in animal feeds.

The following examples are illustrative of the invention.

EXAMPLE 1

7-[(D-1-Carbamyl-2-pyrrolidinyl)formamido]-cephalosporanic acid

A suspension of 115 mg of D-proline (1.0 mmole) in 2.0 ml of water is treated with 146 mg of potassium cyanate (1.8 mmoles). The suspension is heated at about 80°C for 5 minutes and the clear solution is allowed to stand for 48 hours at room temperature with the pH being adjusted to between 5.0 and 6.5 after 12, 24 and 36 hours with 6N hydrochloric acid. At 48 hours the solution is chilled in an ice bath and acidification with hydrochloric acid to pH 1.0 precipitates the N-carbamyl derivative. This is washed with a few ml of cold water and dried over calcium chloride in a desiccator to yield 80 mg of the desired compound.

A solution containing 79 mg of N-carbamyl-D-proline (0.5 mmoles) in 0.5 ml of acetone containing 0.07 ml of triethylamine is converted to a mixed carbonic anhydride by treating with 0.05 ml of ethyl chloroformate for about 30 minutes at a temperature range of from 0°C to −20°C. A cold (about −10°C) solution of 136 mg of 7-aminocephalosporanic acid in 2.0 ml of 1:1 acetone-water containing 51 mg of triethylamine are added to the solution of mixed anhydride and the reaction mixture stirred vigorously at about 0°C for approximately 30 to 45 minutes. The volume of the solution is reduced by evaporating the acetone at room temperature or below. Acidification precipitates 7-[(D-1-carbamyl-2-pyrrolidinyl)formamido]cephalosporanic acid.

EXAMPLE 2

7-[(D-1-Carbamyl-2-pyrrolidinyl)formamido]-cephalosporanic acid, sodium salt

One-half millimole of 7[(D-1-carbamyl-2-pyrrolidinyl)-formamido]-cephalosporanic acid is dissolved in 5 ml of a 0.1N aqueous sodium hydroxide solution. Lyophilization of the solution yields the desired sodium salt.

EXAMPLE 3

7-[(Allo-D-1-carbamyl-4-hydroxy-2-pyrrolidinyl)-formamido]-cephalosporanic acid

A suspension of 1.0 mmole of hydroxy-D-proline(allo) in 2.0 ml of water is treated with 1.8 mmole of potassium cyanate. The suspension is heated at about 80°C for five minutes and the clear solution is allowed to stand for 48 hours at room temperature with the pH being adjusted to between 5.0 and 6.5 after 12, 24 and 36 hours with 6N hydrochloric acid. At 48 hours the solution is chilled in an ice bath and acidification with hydrochloric acid to pH 1.0 precipitates the N-carbamyl derivative. This is washed with a few ml of cold water and dried over calcium chloride in a desiccator.

A solution containing 0.5 mmole of N-carbamylhydroxy-D-proline(allo) in 0.5 ml of acetone containing 0.07 ml of triethylamine is converted to a mixed carbonic anhydride by treating with 0.05 ml of ethyl chloroformate for about 30 minutes at a temperature range of 0°C to −20°C. A cold (about −10°C) solution of 0.5 mmole of 7-aminocephalosporanic acid in 2.0 ml of 1:1 acetone-water containing 51 mg of triethylamine is added to the solution of mixed anhydride and the reaction mixture stirred vigorously at about 0°C for approximately 30 to 45 minutes. The volume of the solution is reduced by evaporating the acetone at room temperature or below. Acidification precipitates 7-[(allo-D-1-carbamyl-4-hydroxy-2-pyrrolidinyl)formamido]-cephalosporanic acid.

EXAMPLE 4

7-[(allo-D-1-carbamyl-4-actoxy-2-pyrrolidinyl)-formamido]-cephalasporanic acid

A suspension of 1.0 mmole of hydroxy-D-proline(allo) in 2.0 ml of water is treated with 1.8 mmole of potassium cyanate. The suspension is heated at about 80°C for 5 minutes and the clear solution is allowed to stand for 48 hours at room temperature with the pH being adjusted to between 5.0 and 6.5 after 12, 24 and 36 hours with 6N hydrochloric acid. At 48 hours the solution is chilled in an ice bath and acidification with hydrochloric acid to pH 1.0 precipitates the N-carbamyl derivative. This is washed with a few ml of cold water and dried over calcium chloride in a desiccator.

A solution of 50 mg of N-carbamyl-hydroxy-D-proline(allo) is dissolved in 5.0 ml of pyridine, and 0.5 ml of acetic anhydride is added with stirring. After allowing the solution to set at room temperature for three hours, 6.0N hydrochloric acid is added until a pH of 1.0 is attained. The acidified solution is extracted four times with 10.0 ml portions of ethyl acetate, the ethyl acetate fractions are pooled, washed two times with 4.0 ml portions of 0.1N hydrochloric acid, dried over sodium sulfate and evaporated to dryness in vacuo at 30°C to obtain N-carbamyl-O-acetyl-D-proline(allo).

A solution containing 0.5 mmoles of N-carbamyl-O-acetyl-D-proline(allo) in 0.5 ml of acetone containing 0.07 ml of triethylamine is converted to a mixed carbonic anhydride by treating with 0.05 ml of ethyl chloroformate for about 30 minutes at a temperature range of from 0°C to −20°C. A cold (about −10°C) solution of 136 mg of 7-aminocephalosporanic acid in 2.0 ml of 1:1 acetone-water containing 51 mg of triethylamine are added to the solution of mixed anhydride and the reaction mixture stirred vigorously at about 0°C for approximately 30 to 45 minutes. The volume of the solution is reduced by evaporating the acetone at room temperature or below. Acidification precipitates 7-[(allo-D-1-carbamyl-4-acetoxy-2-pyrrolidinyl)formamido]-cephalosporanic acid.

EXAMPLE 5

7-[(D-1-carbamyl-2-pyrrolidinyl)formamido]3-desacetoxycephalosporanic acid

A suspension of 115 mg of D-proline (1.0 mole) in 2.0 ml of water is treated with 146 mg of potassium cyanate (1.8 mmoles). The suspension is heated at about 80°C for five minutes and the clear solution is allowed to stand for 48 hours at room temperature with the pH being adjusted to between 5.0 and 6.5 after 12, 24 and 36 hours with 6N hydrochloric acid. At 48 hours the solution is chilled in an ice bath and acidification with hydrochloric acid to pH 1.0 precipitates the N-carbamyl derivative. This is washed with a few ml of cold water and dried over calcium chloride in a desiccator to yield 80 mg of the desired compound.

A solution containing 79 mg of N-carbamyl-D-proline (0.5 mmoles) in 0.5 ml of acetone containing 0.07 ml of triethylamine is converted to a mixed carbonic anhydride by treating with 0.05 ml of ethyl chloroformate for about 30 minutes at a temperature range of from 0°C to −20°C. A cold (about −10°C) solution of 107 mg of 7-amino-3-desacetoxycephalosporanic acid (7–ADCA) in 2.0 ml of 1:1 acetone-water containing 51 mg of triethylamine are added to the solution of mixed anhydride and the reaction mixture stirred vigorously at about 0°C for approximately 30 to 45 minutes. The volume of the solution is reduced by evaporating the acetone at room temperature or below. Acidification precipitates 7-[(D-1-carbamyl-2-pyrrolidinyl)-formamido]-3-desacetoxycephalosporanic acid.

EXAMPLE 6

7-[(D-1-carbamyl-2-pyrrolidinyl)formamido]--pyrrolidinyl)-formamido]-desacetoxycephalosporanic acid, sodium salt One-half millimole of 7-[(D-1-carbamyl-2-pyrrolidinyl)-formamido -3-desacetoxycephalosporanic acid is dissolved in 5 ml of 0.1N aqueous sodium hydroxide solution. Lyophilization of the solution yields the desired sodium salt.

EXAMPLE 7

7-[(allo-D-1-carbamyl-4-hydroxy-2-pyrrolidinyl)-formamido- ]-3-desacetoxycephalosporanic acid A suspension of 1.0 mmole of hydroxy-D-proline(allo) in 2.0 ml of water is treated with 1.8 mmole of potassium cyanate. The suspension is heated at about 80°C for five minutes and the clear solution is allowed to stand for 48 hours at room temperature with the pH being adjusted to between 5.0 and 6.5 after 12, 24 and 36 hours with 6N hydrochloric acid. At 48 hours the solution is chilled in an ice bath and acidification with hydrochloric acid to pH 1.0 precipitates the N-carbamyl derivative. This is washed with a few ml of cold water and dried over calcium chloride in a desiccator.

A solution containing 0.5 mmoles of N-carbamyl-hydroxy-D-proline(allo) in 0.5 of acetone containing 0.07 ml of triethylamine is converted to a mixed carbonic anhydride by treating with 0.05 ml of ethyl chloroformate for about 30 minutes at a temperature range of from 0°C to −20°C. A cold (about −10°C) solution of 0.5 mmole of 7-amino-3-desacetoxycephalosporanic acid (7–ADCA) in 2.0 ml of 1:1 acetone-water contianing 51 mg of triethylamine is added to the solution of mixed anhydride and the reaction mixture stirred vigorously at about 0°C for approximately 30 to 45 minutes. The volume of the solution is reduced by evaporating the acetone at room temperature or below. Acidification precipitates 7-[(allo-D-1-carbamyl-4-hydroxy-2-pyrrolidinyl)formamido]-3-desacetoxycephalosporanic acid.

EXAMPLE 8

7-[(allo-D-1-carbamyl-4-acetoxy-2-pyrrolidinyl)-formamido]-3-desacetoxycephalosporanic acid A suspension of 1.0 mmole of hydroxy-proline(allo) (allo) in 2.0 ml of water is treated with 1.8 mmole of potassium cyanate. The suspension is heated at about 80°C for five minutes and the clear solution is allowed to stand for 48 hours at room temperature with the pH being adjusted to between 5.0 and 6.5 after 12, 24 and 36 hours with 6N hydrochloric acid. At 48 hours the solution is chilled in an ice bath and acidification with hydrochloric acid to pH 1.0 precipitates the N-carbamyl derivative. This is washed with a few ml of cold water and dried over calcium chloride in a desiccator.

A solution of 50 mg of N-carbamyl-D-proline(allo) is dissovled in 5.0 ml of pyridine, and 0.5 ml of acetic anhydride is added with stirring. After allowing the solution to set at room temperature for three hours, 6.0N hydrochloric acid is added until a pH of 1.0 is attained. The acidified solution is extracted four times with 10.0 ml portions of ethyl acetate, the ethyl acetate fractions are pooled, washed two times with 4.0 ml portions of 0.1N hydrochloric acid, dried over sodium sulfate and evaporated to dryness in vacuo at 30°C to obtain N-carbamyl-O-acetyl-D-proline(allo).

A solution containing 0.5 mmoles of N-carbamyl-hydrxoy-D-proline(allo) in 0.5 ml of acetone containing 0.07 ml of triethylamine is converted to a mixed carbonic anhydride by treating with 0.05 ml of ethyl chloroformate for about 30 minutes at a temperature range of from 0°C to −20°C. A cold (about −10°C) solution of 107 mg of 7-amino-3-desacetoxycephalosporanic acid in 2.0 ml of 1:1 acetone-water containing 51 mg of triethylamine are added to the solution of mixed anhydride and the reaction mixture stirred vigorously at about 0°C for approximately 30 to 45 minutes. The volume of the solution is reduced by evaporating the acetone at room temperature or below. Acidification precipitates 7-[(allo-D-1-carbamyl-4-acetoxy-2-pyrrolidinyl)formamido]-3-desacetoxycephalosporanic acid.

EXAMPLE 9

7-[(D-1-carbamyl-2-pyrrolidinyl)formamido]-cephalosporanic acid

A suspension of 115 mg of D-proline (1.0 mmole) in 2.0 ml of water is treated with 146 mg of potassium cyanate (1.8 mmoles). The suspension is heated at about 80°C for 5 minutes and the clear solution is allowed to stand for 48 hours at room temperature with the pH being adjusted to between 5.0 and 6.5 after 12, 24 and 36 hours with 6N hydrochloric acid. At 48 hours the solution is chilled in an ice bath and acidification with hydrochloric acid to pH 1.0 precipitates the N-carbamyl derivative. This is washed with a few ml of cold water and dried over calcium chloride in a desiccator to yield 80 mg of the desired compound.

51.5 mg of N-carbamyl-D-proline are added to 6.0 ml of water, the pH adjusted to 6.5 with 1.0N potassium hydroxide, and the final volume brought to 7.0 ml with water. This is treated with a solution of 135 mg of dicyclohexylcarbodiimide in 28.0 ml of acetone. After 45 minutes at 24°C, 88 mg of 7–ACA is added with stirring and the reaction mixture set aside for 4 hours. The pH is readjusted to 6.5 with hydrochloric acid and the reaction mixture set aside for another 16 hours. The acetone is removed in vacuo at 30°C and the remaining aqeuous mixture freed of dicyclohexylurea and other insoluble material by filtration. Water is added to the filtrate to adjust the volume to 10.0 ml, ammonium sulfate is added to saturate the solution, the pH is adjusted to 3.5 with 6N hydrochloric acid and the solution then extracted five times with 20 ml portions of ethyl acetate. The ethyl acetate fractions are washed two times with 0.5 ml portions of H₂O, pooled, dried with sodium sulfate and then concentrated to dryness in vacuo at 30°C. The concentrate is washed two times with 0.5 ml portions of benzene, the benzene insoluble material is taken up in a few ml of acetone and the actone solution dried in vacuo at 30°C to yeild 7-[(D-1-carbamyl-2-pyrrolidinyl)formamido]-cephalosporanic acid.

EXAMPLE 10

7-[(1-carbamyl-2-aziridinyl)formamido]-cephalosporanic acid

A suspension of 1 mmole of aziridine-2-carboxylic acid in 2.0 ml of water is treated with 1.8 mmoles of potassium cyanate. The suspension is heated at about 80°C for 5 minutes and the clear solution is allowed to stand for 48 hours at room temperature with the pH being adjusted to between 5.0 and 6.5 after 12, 24 and 36 hours with 6N hydrochloric acid. At 48 hours the solution is chilled in an ice bath and acidification with hydrochloric acid to pH 1.0 precipitates the N-carbamyl derivative. This is washed with a few ml of cold water and dried over calcium chloride in a desiccator.

A solution containing 0.5 mmoles of N-carbamylaziridine-2-carboxylic acid in 0.5 ml of acetone containing 0.07 ml of triethylamine is converted to a mixed carbonic anhydride by treating with 0.05 ml of ethyl chloroformate for about 30 minutes at a temperature range of 0°C to −20°C. A cold (about −10°C) solution of 0.5 mmole of 7-aminocephalosporanic acid (7–ACA) in 2.0 ml of 1:1 acetone-water containing 51 mg of triethylamine is added to the solution of mixed anhydride and the reaction mixture stirred vigorously at about 0°C for approximately 30 to 45 minutes. The volume of the solution is reduced by evaporating the acetone at room temperature or below. Acidification precipitates 7-[(1-carbamyl-2-aziridinyl)-formamido]-cephalosporanic acid.

EXAMPLE 11

7-[(1-Carbamyl-2-azetidinyl)formamido-3-desacetoxycephalosporanic acid

A suspension of 1 mmole of azetidine-2-carboxylic acid in 2.0 ml of water is treated with 1.8 mmoles of potassium cyanate. The suspension is heated at about 80°C for 5 minutes and the clear solution is allowed to stand for 48 hours at room temperature with the pH being adjusted to between 5.0 and 6.5 after 12, 24 and 36 hours with 6N hydrochloric acid. At 48 hours the solution is chilled in an ice bath and acidification with hydrochloric acid to pH 1.0 precipitates the N-carbamyl derivative. This is washed with a few ml of cold water and dried over calcium chloride in a desiccator.

A solution containing 0.5 mmole of N-carbamylazetidine-2-carboxylic acid in 0.5 ml of acetone containing 0.07 ml of triethylamine is converted to a mixed carbonic anhydride by treating with 0.05 ml of ethyl chloroformate for about 30 minutes at a temperature range of from 0°C to −20°C. A cold (about −10°C) solution of 0.5 mmole of 7-amino-3-desacetoxycephalosporanic acid (7–ADCA) in 2.0 ml of 1:1 acetone-water containing 51 mg of triethylamine is added to the solution of mixed anhydride and the reaction mixture stirred vigorously at about 0°C for approximately 30 to 45 minutes. The volume of the solution is reduced by evaporating the acetone at room temperature or below. Acidification precipitates 7-[(1-carbamyl-2-azetidinyl)formamido]-3-desacetoxycephalosporanic acid.

EXAMPLE 12

7-[(1-Carbamyl-2-hexahydroazepinyl) formamido]-cephalosporanic acid

A suspension of 1 mmole of hexahudroazepine-2-carboxylic acid in 2.0 ml of water is treated with 1.8 mmoles of potassium cyanate. The suspension is heated at about 80°C for 5 minutes and the clear solution is allowed to stand for 48 hours at room temperature with the pH being adjusted to between 5.0 and 6.5 after 12, 24 and 36 hours with 6N hydrochloric acid. At 48 hours the solution is chilled in an ice bath and acidification with hydrochloric acid to pH 1.0 precipitates the N-carbamyl derivative. This is washed with a few ml of cold water and dried over calcium chloride in a desiccator.

A solution containing 0.5 mmoles of N-carbamyl-hexahydroazepine-2-carboxylic acid in 0.5 ml of acetone containing 0.07 ml of triethylamine is converted to a mixed carbonic anhydride by treating with 0.05 ml of ethyl chloroformate for about 30 minutes at a temperature range of from 0°C to −20°C. A cold (about −10°C) solution of 0.5 mmole of 7-aminocephalosporanic acid (7-ACA) in 2.0 ml of 1:1 acetone-water containing 51 mg of triethylamine is added to the solution of mixed anhydride and the reaction mixture stirred vigorously at about 0°C for approximately 30 to 45 minutes. The volume of the solution is reduced by evaporating the acetone at room temperature or below. Acidification precipitates 7-[(1-carbamyl-2-hexahydroazepinyl)-formamido]-cephalosporanic acid.

EXAMPLE 13

7-[(1-Carbamyl-4-hydroxy-piperidinyl-2) formamido]-3-desacetoxycephalosporanic acid A suspension of 1 mmole of 4-hydroxypipecolic acid in 2.0 ml of water is treated with 1.8 moles of potassium cyanate. The suspension is heated at about 80°C for 5 minutes and the clear solution is allowed to stand for 48 hours at room temperature with the pH being adjusted to between 5.0 and 6.5 after 12, 24 and 36 hours with 6N hydrochloric acid. At 48 hours the solution is chilled in an ice bath and acidification with hydrochloric acid to pH 1.0 precipitates the N-carbamyl derivative. This is washed with a few ml of cold water and dried over calcium chloride in a desiccator.

A solution containing 0.5 mmoles of N-carbamyl-4-hydroxypipecolic acid in 0.5 ml of acetone containing 0.07 ml of triethylamine is converted to a mixed carbonic anhydride by treating with 0.05 ml of ethyl chloroformate for about 30 minutes at a temperature range of from 0°C to −20°C. A cold (about −10°C) solution of 0.5 mmole of 7-amino-3-desacetoxycephalosporanic acid in 2.0 ml of 1:1 acetone-water containing 51 mg of triethylamine is added to the solution of mixed anhydride and the reaction mixture stirred vigorously at about 0°C for approximately 30 to 45 minutes. The volume of the solution is reduced by evaporating the acetone at room temperature or below. Acidification precipitates 7-[(1-carbamyl-4-hydroxypiperidinyl-2) formamido]-3-desacetoxycephalosporanic acid.

EXAMPLE 14

7-[(1-Carbamyl-5-hydroxy-piperidinyl-2) formamido]-cephalosporanic acid

A suspension of 1 mmole of 5-hydroxypipecolic acid in 2.0 ml water is treated with 1.8 mmoles of potassium cyanate. The suspension is heated at about 80°C for 5 minutes and the clear solution is allowed to stand for 48 hours at room temperature with the pH being adjusted to between 5.0 and 6.5 after 12, 24 and 36 hours with 6N hydrochloric acid. At 48 hours the solution is chilled in an ice bath and acidification with hydrochloric acid to pH 1.0 precipitates the N-carbamyl derivative. This is washed with a few ml of cold water and dried over calcium chloride in a desiccator.

A solution contining 0.5 mmole of N-carbamyl-5-hydroxy-pipecolic acid in 0.5 ml of acetone containing 0.07 ml of triethylamine is converted to a mixed carbonic anhydride by treating with 0.05 ml of ethyl chloroformate for about 30 minutes at a temperature range of from 0°C to −20°C. A cold (about −10°C) solution of 0.5 mmole of 7-aminocephalosporanic acid (7–ACA) in 2.0 ml of 1:1 acetone-water containing 51 mg of triethlamine is added to the solution of mixed anhydride and the reaction mixture stirred vigorously at about 0°C for approximately 30 to 45 minutes. The volume of the solution is reduced by evaporating the acetone at room temperature or below. Acidification precipitates 7-[(1-carbamyl-5-hydroxypiperidinyl-2) formamido]-cephalosporanic acid.

What is claimed is:

1. A compound of the formula

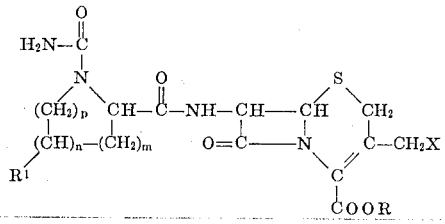

wherein R is hydrogen, lower alkyl,

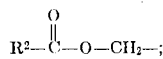

an alkali metal, or an alkaline earth metal; $R^1$ is hydrogen, hydroxy, or

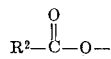

$R^2$ is lower alkyl or monocycliccarbocyclicaryl; X is hydrogen, hydroxy, or

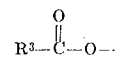

wherein $R^3$ is lower alkyl; or together X and R represent a bond linking carbon and oxygen in a lactone ring; $n$ is 0 or 1; $m$ is 0, 1, 2, 3, or 4; $p$ is 1, 2, 3, or 4; and the sum of $m + n + p$ is 1, 2, 3, 4, or 5.

2. A compound as defined in claim 1 wherein $R^1$ is hydrogen.

3. A compound as defined in claim 1 wherein $R^1$ is hydroxy.

4. A compound as defined in claim 1 wherein $R^1$ is

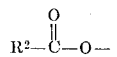

5. A compound as defined in claim 1 wherein X is hydrogen or acetoxy.

6. A compound as defined in claim 1 wherein $n$ is 1, $m$ is 1, and $p$ is 1.

* * * * *